(12) United States Patent
Bilac et al.

(10) Patent No.: US 7,538,992 B2
(45) Date of Patent: May 26, 2009

(54) SYSTEM, DEVICE, AND METHOD FOR OVER-CURRENT RELAYS PROTECTING MOTORS

(75) Inventors: Mario Bilac, Lawrenceville, GA (US); Chun Fan, Duluth, GA (US); Mikhail Golod, Alpharetta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 211 days.

(21) Appl. No.: 11/542,787

(22) Filed: Oct. 4, 2006

(65) Prior Publication Data

US 2007/0103822 A1 May 10, 2007

Related U.S. Application Data

(60) Provisional application No. 60/727,464, filed on Oct. 17, 2005.

(51) Int. Cl.
*H02H 7/08* (2006.01)
(52) U.S. Cl. ............................ 361/32; 361/23; 318/432; 318/434; 323/274; 323/284
(58) Field of Classification Search .................. 318/432, 318/434; 323/274, 284; 361/23, 32
See application file for complete search history.

(56) References Cited

U.S. PATENT DOCUMENTS

| | | | | |
|---|---|---|---|---|
| 4,432,031 A | * | 2/1984 | Premerlani | ................... 361/97 |
| 4,788,619 A | * | 11/1988 | Ott et al. | ..................... 361/91.1 |
| 5,206,572 A | | 4/1993 | Farag et al. | |
| 5,675,497 A | * | 10/1997 | Petsche et al. | ............... 702/182 |
| 6,125,024 A | * | 9/2000 | LeComte et al. | ............. 361/104 |
| 6,338,026 B2 | * | 1/2002 | Hofmann et al. | ............... 702/64 |
| 6,459,557 B1 | * | 10/2002 | Haensgen et al. | .......... 361/93.2 |
| 6,522,094 B1 | * | 2/2003 | Griesemer et al. | .......... 318/430 |
| 6,806,669 B2 | * | 10/2004 | Griesemer et al. | .......... 318/434 |
| 6,995,964 B2 | * | 2/2006 | Plemmons et al. | ............ 361/31 |
| 7,091,686 B2 | * | 8/2006 | Kagei | ......................... 318/434 |

(Continued)

FOREIGN PATENT DOCUMENTS

WO         EP0847122 A2    6/1998

(Continued)

OTHER PUBLICATIONS

PCT International Search Report, Mailed Feb. 6, 2007.

(Continued)

*Primary Examiner*—Rita Leykin

(57) ABSTRACT

A system, method, and device for protecting an induction motor are disclosed. The exemplary system may have a module for determining the current drawn by the motor and a module for determining the state of the motor. The system may calculate a used thermal capacity based on a first formula when the motor is in an active state. The system also calculates the used thermal capacity based on a second formula when the motor is in an inactive state. When the used thermal capacity attains a threshold, the relay is tripped thus removing current to the motor and preventing motor from overheating. A method to derive thermal time constants from desired trip time limits (such as those defined by IEC standards or the thermal limit curves provided by motor manufacturers) is also presented. For example, the thermal time constants can then be used in tacking motor used thermal capacity throughout various motor states.

15 Claims, 7 Drawing Sheets

U.S. PATENT DOCUMENTS

| | | | |
|---|---|---|---|
| 7,123,457 B2 * | 10/2006 | Schweitzer et al. | 361/25 |
| 7,161,778 B2 * | 1/2007 | Zocholl | 361/25 |
| 7,167,348 B2 * | 1/2007 | Knox et al. | 361/23 |
| 2003/0146725 A1 * | 8/2003 | Griesemer et al. | 318/434 |
| 2004/0252421 A1 * | 12/2004 | Knox et al. | 361/23 |
| 2004/0264073 A1 | 12/2004 | Zocholl | 361/23 |
| 2004/0264074 A1 * | 12/2004 | Schweitzer et al. | 361/23 |
| 2005/0122642 A1 * | 6/2005 | Plemmons et al. | 361/23 |

FOREIGN PATENT DOCUMENTS

WO        EP1107416 A      6/2001

OTHER PUBLICATIONS

Venkataraman B et al. "Fundamentals of a Motor Thermal Model and its Applications in Motor Protection"; IEEE Apr. 5, 2005, pp. 127-144, XP010794876.

IEEE Std. C37.112-1996, IEEE Standard Inverse-Time Characteristic Equations for Overcurrent Relays.

Benmouyal, G.; Meisinger, M.; Burnworth, J.; Elmore, W.A.; Freirich, K.; Kotos, P.A.; Leblanc, P.R.; Lerley, P.J.; McConnell, J.E.; Mizener, J.; Pinto deSa, J.; Ramaswami, R.; Sachdev, M.S.; Strang, W.M.; Waldron, J.E.; Watansiriroch, S.; Zocholl, S.E.; "IEEE Standard Inverse-time Characteristic equations for overcurrent relays", IEEE Transactions on Power Delivery, vol. 14, Issue 3, Jul. 1999, pp. 868-872.

Amendment 2 to IEC 60947-4-2, Ed.2, Document No. 17B/1406/CC.

IEC 60947-4-2 Edition 2.1 Mar. 2002, Low-Voltage Switchgear and Controlgear—Part 4-2: Contractors and Motor-Starters—AC Semiconductor Motor Controllers and Starters.

IEEE Std. 620-1996, IEEE Guide for the Presentation of Thermal Limit Curves for Squirrel Cage Induction Machines.

Abou-El-Ela, M.S.; Megahed, A.I.; Malik, O.P.; "Thermal model based digital relaying algorithm for induction Motor protection", Electrical and Computer Engineering, 1996. Canadian Conference on, vol. 2, May 26-29, 1996, pp. 1016-1019, vol. 2.

\* cited by examiner

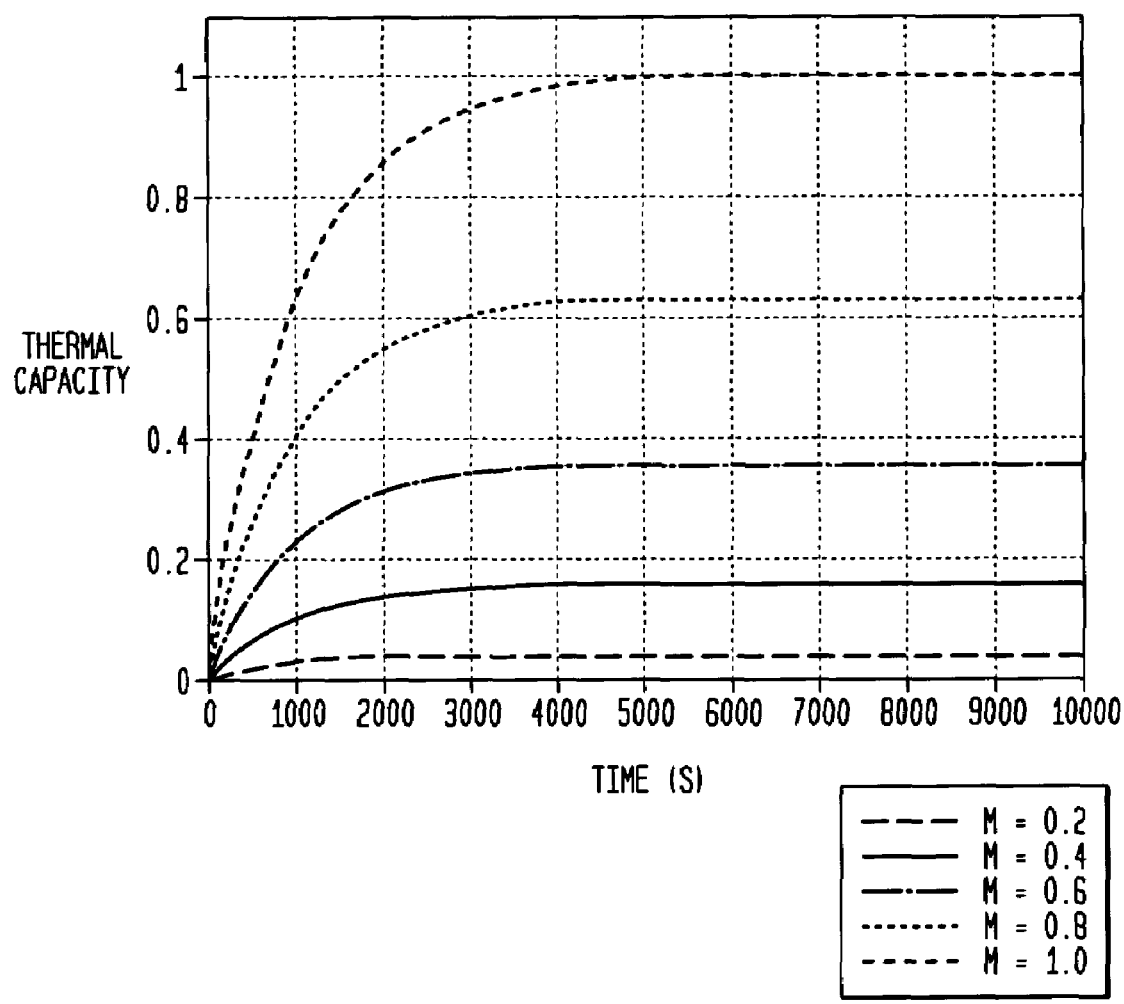

TRIP CURVES DERIVED FROM IEC STANDARD

SYSTEM, DEVICE, AND METHOD FOR OVER-CURRENT RELAYS PROTECTING MOTORS

CROSS REFERENCE TO RELATED APPLICATIONS

This application is related to U.S. Provisional Patent Application No. 60/727,464 filed Oct. 17, 2005 entitled "Thermal model based DSP algorithm for solid-state over current relays protecting AC motors", which is incorporated fully herein by reference.

TECHNICAL FIELD

The present invention relates to controls and protection for motors and more particularly, to a device, method, and system for determining the thermal properties of a motor.

BACKGROUND INFORMATION

In current practice, there are two types of control algorithms for solid-state over-current relays, namely, electromechanical relay algorithm [1][2] and $I^2t$ algorithm. The electromechanical relay algorithm is derived from the model of electromechanical relay using the following:

$$t(I) = \frac{t_r}{M^2 - 1} \quad \text{For } 0 < M < 1 \quad \text{A1}$$

$$t(I) = \frac{A}{M^P - 1} + B \quad \text{For } M > 1 \quad \text{A2}$$

Where
t(I) is the reset time in Eq. (A1) or trip time in Eq. (A2) in seconds,
M is the $I_{input}/I_{pickup}$ ($I_{pickup}$ is the relay current set point),
$t_r$ is the rest time (for M=0) defined in IEEE Std C37.112-1996 Table 1,
A, B, constants defined in IEEE Std C37.112-1996
p Table 1 to provide selected curve characteristics.
The relay will trip if $$\int_0^{T_p} \frac{1}{t(I)} dt > 1 \quad \text{A3}$$

The discrete form of equation A3 is $$\sum_{k=0}^{k=n} \frac{\Delta t}{t(I_k)} > 1 \quad \text{A4}$$

Where
$T_p$ trip time in seconds,
$\Delta t$ Sample period in seconds,
$t(I_k)$ t(I) calculated from Eq. (A1) or Eq. (A2) for $k^{th}$ sample of current I.
For $0<M<1$, $t(I_k)$ is a negative number. If the summation in equation A4 keeps going, the sum value will go to $-\infty$. Because this algorithm simulates the reset dynamics of electromechanical relays, the summation shall be stopped if $$\sum_{k=0}^{k=n} \frac{\Delta t}{t(I_k)} < 0 \quad \text{A5}$$

This is equivalent to saying that a motor will reach the same equilibrium temperature without regard to what state the motor is operating. The algorithm does not take into account whether the motor is operating at 50% $I_{FLA}$ or at 80% $I_{FLA}$. In reality, a motor reaches different equilibrium temperatures when different currents are supplied to the motor. Therefore equation A1 does not simulate motor thermal dynamics for $0<M<1$, which results in the algorithm not accurately tracking the used thermal capacity of AC motor under varying load.

The $I^2t$ algorithm uses a locked rotor current $I_{LR}$ and safe stall time $t_{LR}$ as motor thermal limit. The cold trip time $t_{trip-C}$ and the hot trip time $t_{trip-H}$ for currents above pickup are defined by $$t_{trip-C} = \left(\frac{I_{LR}}{I}\right)^2 t_{LRC} \quad \text{B1}$$

$$t_{trip-H} = \left(\frac{I_{LR}}{I}\right)^2 t_{LRH} \quad \text{B2}$$

The used thermal capacity $\theta_n$ is calculated by $$\theta_n = \frac{\Delta t}{t_{trip}} + \theta_{n-1} \quad \text{B3}$$

There is a $\theta_{hot}$ or $t_{hot}$ to determine the switch of $t_{trip}$ from $t_{trip-C}$ to $t_{trip-H}$. Note that equation B3 is usually implemented in DSP and is updated only when M>1. There is no update of $\theta_n$ for M<1 so this algorithm does not consider the cooling effect of 0<M<1.

The Amd2 [3] of IEC 60947-4-2 [4] imposes new thermal memory test requirements on solid-state relay protecting AC induction motors, which state: electronic overload relays shall fulfill the following requirements (note table and figures references are provided in Amendment 2 to standard IEC 60947-4-2):
apply a current equal to Ie until the device has reached the thermal equilibrium;
interrupt the current for a duration of $2 \times T_p$ (see Table 2 of [3]) with a relative tolerance of ±10% (where $T_p$ is the time measured at the D current according to Table 3 of [3]);
apply a current equal to 7.2×Ie; and
the relay shall trip within 50% of the time $T_p$.

From the analysis above, it is seen that both electromechanical relay algorithm and $I^2t$ algorithm may fail the thermal memory test and may not provide sufficient protection to AC induction motors. Accordingly, a need exists for a device, method, and system relay algorithm based on motor thermal model. The algorithm may accurately track a motor's used thermal capacity when the motor's current varies at any value satisfying $M \geq 0$.

SUMMARY

The present invention is a novel device, system, and method for an over-current relay protecting an induction motor comprising the following actions. The exemplary method may determine the current drawn by the motor. The method may also determine the state of the motor. The method may then calculate a used thermal capacity based on a first formula when the motor is in an active state. The method may also calculate the used thermal capacity based on a second formula when the motor is in an inactive state. Once the used thermal capacity attains a threshold the method may trip the relay, remove current from the motor, and prevent the motor from overheating.

The invention may include the following embodiments. In one exemplary embodiment, the first formula for used thermal capacity is $$\theta_n = M_n^2 \times \frac{\Delta t}{T_h} + \theta_{n-1} \times \left(1 - \frac{\Delta t}{T_h}\right).$$

In another exemplary embodiment, the second formula for used thermal capacity is $$\theta_n = \theta_{n-1} \times \left(1 - \frac{\Delta t}{T_c}\right).$$

In other exemplary embodiments, the method may calculate the used thermal capacity based on a third formula when the motor is in an acceleration state. In yet another exemplary embodiment, the method may calculate the used thermal capacity based on a fourth formula when the motor is in a deceleration state.

It is important to note that the present invention is not intended to be limited to a system or method which must satisfy one or more of any stated objects or features of the invention. It is also important to note that the present invention is not limited to the exemplary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings herein:

FIG. 4 is the used capacity of different M values.

DETAILED DESCRIPTION

The present invention provides a control algorithm for solid-state relay protecting for induction motors. The algorithm utilizes a thermal model of an AC induction motors. The algorithm calculates used thermal capacity of the motors based on motor currents. The relay trips once the used thermal capacity reaches limit. This invention also provides a method to derive thermal time constants from motor thermal limit curves and IEC standard 60947-4-2 [3][4]. The thermal time constants may then used in the control algorithm 600 and 700 for calculation of the used thermal capacity. The resultant algorithm may then satisfy the requirements of motor thermal limit curves and IEC standard 60947-4-2 [3][4].

The following is a list of nomenclature used throughout the application.

q heat input to a motor per second, its unit is Joules/sec, i.e., Watts, dt an infinitely small time interval in seconds, $\tau$ temperature rise in ° C., defined as the temperature difference between the motor and its surroundings, $\tau_{fin}$ temperature rise at thermal equilibrium in ° C., $R_{th}$ thermal resistance in ° C./Watt, defined as the temperature difference that will cause 1 Watt to flow between the motor and its surroundings, $C_{th}$ thermal capacitance in Joules/° C., i.e, in Watts*seconds/° C., defined as the energy required to change the motor's temperature by 1° C. if no heat is exchanged with its surroundings (adiabatic process), $T_{th}$ thermal time constant in seconds. If power input and ambient temperature remain constant, temperature will change 63% of the remaining excursion in 1 $T_{th}$. $T_{th} = R_{th} C_{th}$, $T_h$ thermal time constant used when motor is running with current inputs, i.e., I>0. In some applications, acceleration thermal time constant $T_{h\text{-}acc}$ is different from running thermal time constants $T_{h\text{-}run}$ for motors above 250 HP, $T_c$ thermal time constant used when currents are removed from the motor, i.e., I=0, $I_{FLA}$ rated full load amperage of the motor, SF service factor of the motor, $I_{pickup}$ pick up current of a relay, $I_{pickup} = SF \times I_{FLA}$, M multiples of $I_{pickup}$, $M = I/I_{pickup}$, $\tau_{max}$ maximum permissible temperature rise above ambient temperature of the motor $\theta$ used thermal capacity = $\tau/\tau_{max}$, $\Delta t$ sampling period of current samples in seconds, $I_{LR}$ locked rotor current, $t_{LRC}$ cold locked rotor safe stall time, $t_{LRH}$ hot locked rotor safe stall time, $t_{trip}$ relay trip time.

Figure 1:
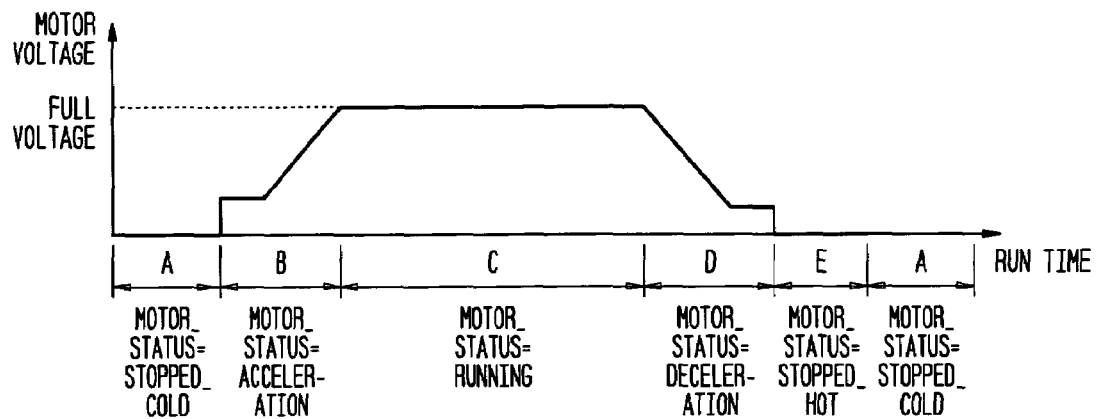
FIG. 1 is the operation status of a motor.

FIG. 1 shows the different operational states or conditions of motors. Motor thermal characteristics during states A, B, C, D, and E may be significantly different. For example, when a totally enclosed fan cooled (TEFC) motor is stopped, the fan is stopped, so heat can not be dissipated as fast as when the motor is running. For motors above 250 horsepower (hp), motor thermal characteristics during state B may be significantly different from those during C and D. An accurate trip curve derived from the thermal limit curves [5] provided by motor manufacturers may need to be used. First a thermal model of the AC motor will be described, from which the used thermal capacity and trip time can be calculated based on thermal time constants. Second, implementation of International Electrotechnical Commission (IEC) standard trip classes using the thermal model algorithm are provided. Third, customized trip curves for motors above 250 HP are discussed. Finally, exemplary flowcharts are provided for applications using standard or custom trip curves. Embodiments and aspects of the invention may be implemented by a variety of Digital Signal Processing (DSP) devices.

As for any other objects, the first order thermal dynamics of a motor is described by:

$$qdt - \frac{\tau}{R_{th}}dt = C_{th}d\tau. \quad\quad 1$$

For an infinitely small time interval dt, qdt is the heat energy input to the motor, $$\frac{\tau}{R_{th}}dt$$

is the heat energy dissipated from the motor to the surrounding, and $C_{th}d\tau$ is the resultant energy change of the motor. Multiplying both sides of Eq. (1) by $R_{th}$, yields:

$$R_{th}qdt - \tau dt = R_{th}C_{th}d\tau. \quad\quad 2$$

Substituting $T_{th}=R_{th}C_{th}$ into Eq. (2) gives:

$$R_{th}qdt - \tau dt = T_{th}d\tau. \quad\quad 3$$

At thermal equilibrium, the heat input and heat loss cancels each other, temperature rise attains a final value $\tau_{fin}$, and the motor temperature will cease to rise, i.e., $d\tau=0°$ C. Hence, Eq. (3) becomes:

$$R_{th}qdt - \tau_{fin}dt = 0. \quad\quad 4$$

Whence:

$$\tau_{fin} = R_{th}q. \quad\quad 5$$

Substituting Eq. (5) into Eq. (3) gives:

$$\tau_{fin}dt - \tau dt = T_{th}d\tau. \quad\quad 6$$

Rearranging Eq. (6) yields:

$$\frac{dt}{T_{th}} = \frac{d\tau}{\tau_{fin}-\tau}. \quad\quad 7$$

Integrating both sides of Eq. (7) gives:

$$\frac{t}{T_{th}} = -\ln(\tau_{fin}-\tau) + k. \quad\quad 8$$

If at the initial moment t=0, the motor has an initial temperature rise $\tau_0$ above the ambient temperature, then Eq. (8):

$$k = \ln(\tau_{fin}-\tau_0). \quad\quad 9$$

Substituting for k in Eq. (8), and solving for $\tau$, gives:

$$\tau = \tau_{fin}\left(1 - e^{-\frac{t}{T_{th}}}\right) + \tau_0 e^{-\frac{t}{T_{th}}}. \quad\quad 10$$

Since motor thermal resistance may be different at different operating conditions, different thermal constants may be used in Eq. (10). When the motor is running, the motor can properly dissipate heat and $T_{th}=T_h$. When currents are removed, the motor will slow down and eventually stop. When the motor is stopped, the motor heat dissipation capability may be reduced and $T_{th}=T_c$. $T_c$ is usually three times of $T_h$ for AC induction motors [7]. The different operating conditions of motors are shown in FIG. 1. Table 1 shows the variants of Eq. (10) used for different motor status.

TABLE 1

Motor Temperature Rise Formula

| Motor Status | Temperature Rise Formula | Description |
|---|---|---|
| B, C, D | $\tau = \tau_{fin}\left(1 - e^{\frac{t}{T_h}}\right) + \tau_o e^{\frac{t}{T_h}}$    11 | obtained by setting $T_{th} = T_h$ in Eq. (10). |
| E | $\tau = \tau_0 e^{\frac{t}{T_h}}$    12 | obtained by setting $\tau_{fin} = 0$ and $T_{th} = T_c$ in Eq. (10). |

The function of a digital overload relay is to translate the current drawn by an AC Induction motor into temperature rise $\tau$, and detect whether this rise of temperature has reached the maximum permissible temperature rise or not. Therefore, the temperature rise may be correlated with the current. The temperature rise at thermal equilibrium of the motor is proportional to current square, i.e, $$\tau_{fin} = k_2 I^2, \quad\quad 13$$

where $k_2$ is a constant. If $I = SF \times I_{FLA} = I_{pickup}$, then $\tau_{fin} = \tau_{max}$ = maximum permissible temperature rise, as indicated in:

$$\tau_{max} = k_2 I_{pickup}^2. \quad\quad 14$$

Substituting Eq. (13) into Eq. (11) and dividing Eq. (11) and Eq. (12) by Eq. (14) yield:

$$\frac{\tau}{\tau_{max}} = \frac{k_2 I^2}{k_2 I_{pickup}^2}\left(1 - e^{\frac{t}{T_h}}\right) + \frac{\tau_0}{\tau_{max}} e^{\frac{t}{T_h}}, \quad\quad 15$$

$$\frac{\tau}{\tau_{max}} = \frac{\tau_o}{\tau_{max}} e^{-\frac{t}{T_c}}. \quad\quad 16$$

Since $$\frac{\tau}{\tau_{max}}$$

is the used thermal capacity $\theta$ of the motor at time t, substituting $$\frac{\tau}{\tau_{max}} = \theta \text{ and } M = \frac{I}{I_{pickupx}}$$

into Eq. (15) and Eq. (16) yields:

$$\theta = M^2\left(1 - e^{-\frac{t}{T_h}}\right) + \theta_o e^{-\frac{t}{T_h}}, \quad\quad 17$$

$$\theta = \theta_o e^{-\frac{t}{T_h}}. \quad\quad 18$$

Given $\Delta t$ as the sampling period of current samples, the discrete forms of Eq. (17) and Eq. (18) are:

$$\theta_n = M_n^2\left(1 - e^{-\frac{\Delta t}{T_h}}\right) + \theta_{n-1} e^{-\frac{\Delta t}{T_h}}, \qquad 19$$

$$\theta_n = \theta_{n-1} e^{-\frac{\Delta t}{T_h}}. \qquad 20$$

To implement Eq. (19) and Eq. (20) in DSP, $$e^{-\frac{\Delta t}{T_{th}}}$$

can be pre-calculated and stored as a constant. A simplified form of these two equations can also be used by noting that when $$\frac{\Delta t}{T_{th}}$$

is small enough, and $$e^{-\frac{\Delta t}{T_h}} \approx 1 - \frac{\Delta t}{T_{th}}. \qquad 21$$

Figure 2:
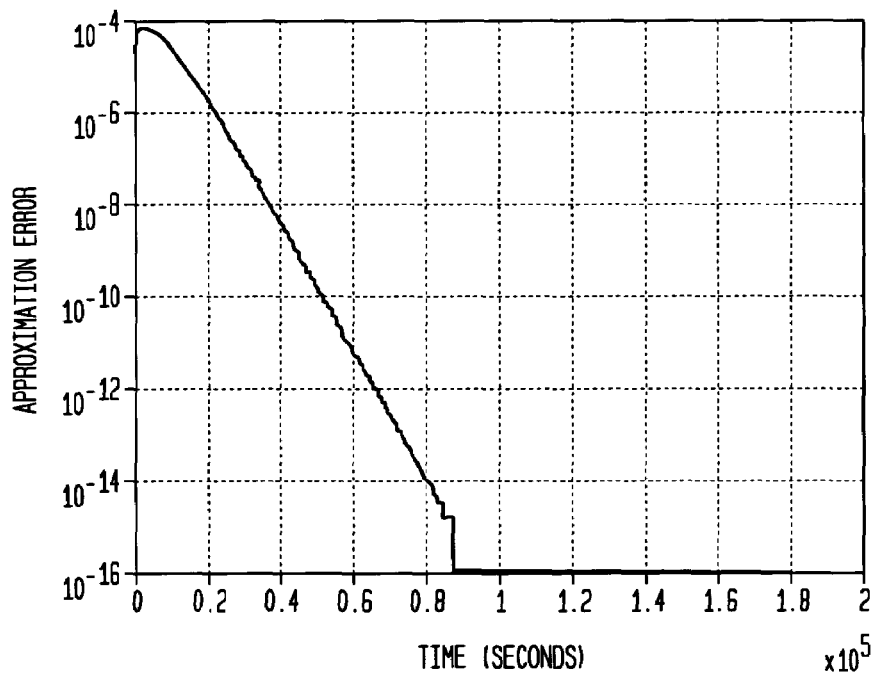
FIG. 2 is the difference in Eq. 19 and Eq. 22 versus time.

Eq. (21) is derived from a Taylor series. Substituting Eq. (21) into Eq. (19) and Eq. (20) gives:

$$\theta_n = M_n^2 \times \frac{\Delta t}{T_h} + \theta_{n-1} \times \left(1 - \frac{\Delta t}{T_h}\right). \qquad 22$$

$$\theta_n = \theta_{n-1} \times \left(1 - \frac{\Delta t}{T_c}\right). \qquad 23$$

where $\theta_n$ is the used thermal capacity at $n^{th}$ sample, $\theta_{n-1}$ is the used thermal capacity at $(n-1)^{th}$ sample, and $M_n$ is the M at $n^{th}$ sample. Because motors may be running for days or months without stopping, it is very important that the error introduced in Eq. (22) and Eq. (23) by the approximation will not diverge as $\Sigma\Delta t \to \infty$. FIG. 2 shows the difference between Eq. (19) and Eq. (22) converges to 0 as $\Sigma\Delta t \to \infty$. Therefore Eq. (22) and Eq. (23) can also be implemented in the DSP to calculate the used thermal capacity dynamically. The relay shall trip if the used thermal capacity is greater than 1. Setting $\theta=1$ in Eq. (17) and solving for trip time gives:

$$t_{trip} = T_h \ln \frac{M^2 - \theta_o}{M^2 - 1}, \qquad 24$$

$$T_h = t_{trip} \div \ln \frac{M^2 - \theta_o}{M^2 - 1}, \qquad 25$$

Eq. (24) can be used to calculate trip time for different M when $T_h$ is know while Eq. (25) can be used to calculate $T_h$ when $t_{trip}$ is known. In the next section, Eq. (25) is used to derive the thermal time constants for the IEC standard trip classes. Note that the derivation from Eq. (1) to Eq. (18) is similar to the derivation in [6]. Further derivation is then different from [6] whose algorithm updates trip time instead of thermal capacity. Both standard and custom trip curves can be derived from Eq. (25). The derivations are demonstrated herein.

The derivations are first demonstrated on IEC standard trip classes. The thermal time constants $T_h$ and $T_c$ in Eq. (22) and Eq. (23) usually can be obtained from motor manufacturer. In the exemplary case, discussed herein, however, IEC standard 60947-4-2 is used to derive the thermal time constants of IEC standard trip classes. Details of the derivation follow. For demonstration, the derivation is only performed on Class 10A, 10, 20, and 30. The derivation for other standard trip classes can be obtained similarly.

TABLE 2

Requirements of IEC 60947-4-2 on performance of non-compensated overload relays

|  | Class 10A | Class 10 | Class 20 | Class 30 |
|---|---|---|---|---|
| A ($1.0 \times I_{pickup}$) | $t_{trip} > 2$ h | $t_{trip} > 2$ h | $t_{trip} > 2$ h | $t_{trip} > 2$ h |
| B ($1.2 \times I_{pickup}$) | $t_{trip} < 2$ h | $t_{trip} < 2$ h | $t_{trip} < 2$ h | $t_{trip} < 2$ h |
| C ($1.5 \times I_{pickup}$) | $t_{trip} < 2$ min | $t_{trip} < 4$ min | $t_{trip} < 8$ min | $t_{trip} < 12$ min |
| $7.2 \times I_{pickup}$ | $2 < t_{trip} \leq 10$ ** | $4 < t_{trip} \leq 10$ ** | $6 < t_{trip} \leq 20$ ** | $9 < t_{trip} <= 30$ ** |
| $8 \times I_{pickup}$ | $1.6 \leq t_{trip} \leq 8.1$ * | $3 \leq t_{trip} \leq 8.1$ * | $5 \leq t_{trip} \leq 16.2$ * | $7 \leq t_{trip} \leq 24.3$ * |
| $7 \times I_{pickup}$ | $2 \leq t_{trip} \leq 10.6$ * | $4 \leq t_{trip} \leq 10.6$ * | $6 \leq t_{trip} \leq 21.2$ * | $9 \leq t_{trip} \leq 31.7$ * |
| $6 \times I_{pickup}$ | $3 \leq t_{trip} \leq 14.4$ * | $6 \leq t_{trip} \leq 14.4$ * | $9 \leq t_{trip} \leq 28.8$ * | $13 \leq t_{trip} \leq 43.2$ * |
| $5 \times I_{pickup}$ | $4 \leq t_{trip} \leq 20.7$ * | $8 \leq t_{trip} \leq 20.7$ * | $12 \leq t_{trip} \leq 41.5$ * | $19 \leq t_{trip} \leq 62.2$ * |
| $4 \times I_{pickup}$ | $6 \leq t_{trip} \leq 32.4$ * | $13 \leq t_{trip} \leq 32.4$ * | $19 \leq t_{trip} \leq 64.8$ * | $29 \leq t_{trip} \leq 97.2$ * |
| $3 \times I_{pickup}$ | $12 \leq t_{trip} \leq 57.6$ * | $23 \leq t_{trip} \leq 57.6$ * | $35 \leq t_{trip} \leq 115.2$ * | $52 \leq t_{trip} \leq 172.8$ * |
| $2 \times I_{pickup}$ | $26 \leq t_{trip} \leq 129.6$ * | $52 \leq t_{trip} \leq 129.6$ * | $78 \leq t_{trip} \leq 259.2$ * | $112 \leq t_{trip} \leq 388.8$ * |

Note:
1. All $t_{trip}$ is counted from cold state at 40° C. except for B ($1.2 \times I_{pickup}$) the $t_{trip}$ is counted from 2 h at $1.0 \times I_{FLA}$ or from relay terminals reach thermal equilibrium at $1.0 \times I_{FLA}$ whichever is less, and for C ($1.5 \times I_{pickup}$) the $t_{trip}$ is counted from thermal equilibrium at $1.0 \times I_{FLA}$.
2. All $t_{trip}$ are in seconds except those stated otherwise.
3. For M >= 2, only one set of tests need to be done. Preferably at $7.2 \times I_{pickup}$, i.e., the requirements denoted by ** are preferred tests. Multiple or single set of requirements denoted by * can be used as alternatives.

The above table summarizes the requirements of IEC on non-compensated overload relays. $T_h$ can be calculated based on the requirement in the above table using Eq. (25). For example, $7.2 \times I_{pickup}$ and Class 10A, $2 < t_{trip} < 10$, the middle value of $$t_{trip} = \frac{2+10}{2} = 6$$

sec, substituting $t_{trip}=6$ sec., M=7.2, and $\theta_0=0$ into Eq. (25) gives the thermal time constant $T_h=308$ sec. Because IEC prefers tests done at $7.2 \times I_{pickup}$ and tests done at other $M \times I_{pickup}$ are just alternatives, the table below only shows the $T_h$ calculated from $7.2 \times I_{pickup}$.

TABLE 3

Thermal time constants $T_h$ calculated for M = 7.2 and $\theta_a = 0$

|  | Class 10A | Class 10 | Class 20 | Class 30 |
|---|---|---|---|---|
| $T_h$ (sec) | 308 | 359 | 667 | 1001 |

The following demonstrates that the thermal algorithm may meet the requirements of IEC standards. The trip time for different M (note again that $$\left(\text{note again that } M = \frac{I}{I_{pickup}}\right)$$

can then be calculated using Eq. (24). Table 4, below, shows the calculated $t_{trip}$ for different M based on the $T_h$ values in the above Table 3.

TABLE 4

Trip time $t_{trip}$ calculated using the $T_h$ values in Table 3

|  | Class 10A | Class 10 | Class 20 | Class 30 |
|---|---|---|---|---|
| M = 8 | 4.85 | 5.66 | 10.51 | 15.77 |
| M = 7.2 | 6.00 | 7.00 | 13.00 | 19.50 |
| M = 7 | 6.35 | 7.41 | 13.76 | 20.64 |
| M = 6 | 8.68 | 10.12 | 18.80 | 28.20 |
| M = 5 | 12.57 | 14.67 | 27.24 | 40.87 |
| M = 4 | 19.88 | 23.19 | 43.07 | 64.61 |
| M = 3 | 36.28 | 42.33 | 78.61 | 117.91 |
| M = 2 | 88.61 | 103.38 | 192.00 | 288.00 |
| M = 1.5 | 54.93* | 64.08* | 119.01* | 178.51* |
| M = 1.2 | 135.90* | 158.55* | 294.45* | 441.67* |
| M = 1.05 | 731.72 | 853.67 | 1585.39 | 2378.08 |
| M = 1 + 1.0E−11 | 7588.41 | 8853.15 | 16441.56 | 24662.35 |

Note:
All $t_{trip}$ is calculated from cold state at 40° C. except that $t_{trip}$ of M = 1.2* and M = 1.5* is calculated from thermal equilibrium at 1.0 × $I_{FLA}$. SF is set to 1.15.

Figure 8:
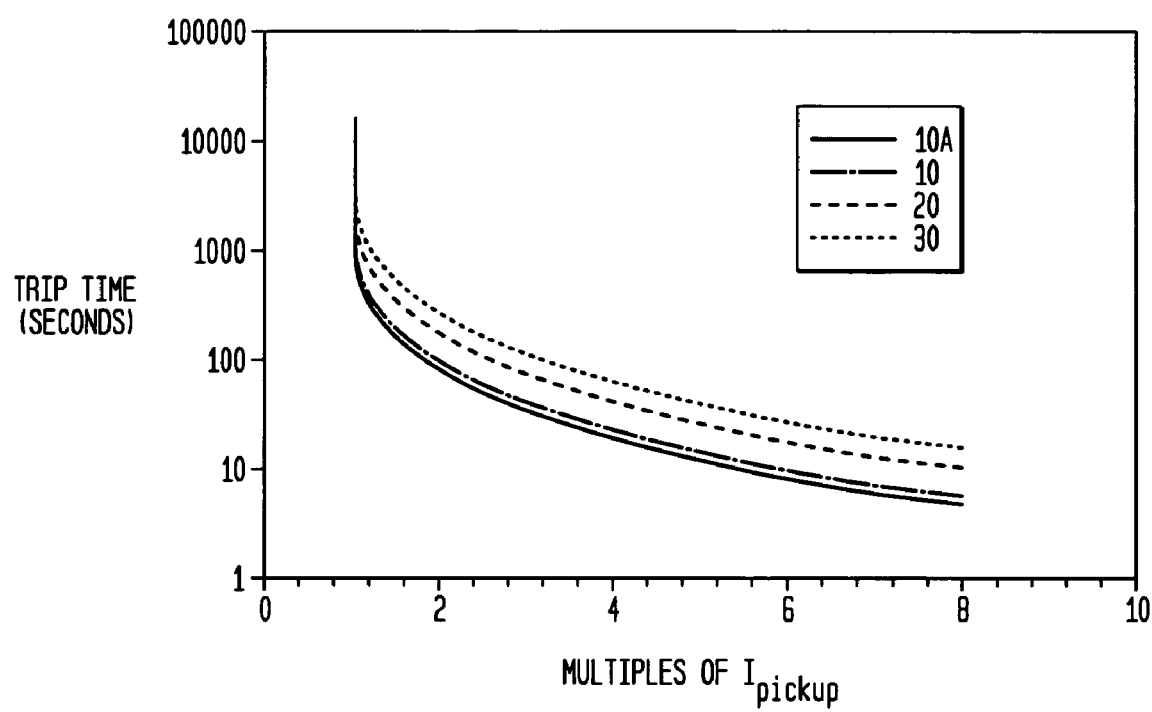
FIG. 8 is sample trip curves derived from IEC standard 60947-4-2 and its amendment 2 using algorithm 600.

Observe that $t_{trip}$ in above table 4 meets all the requirement shown in table 2. For demonstration, FIG. 8 shows the cold trip curves of IEC class 10A, 10, 20, and 30. Note that the hot trip curves and trip curves of other IEC trip classes can be obtained similarly. The hot and cold trip times for M=7.2 are listed below in Table 5. The hot trip time and cold trip time for M=7.2 can also be simulated using Eq. (22).

TABLE 5

Hot and cold trip time for M = 7.2

|  | Class 10A | Class 10 | Class 20 | Class 30 |
|---|---|---|---|---|
| Cold trip time (sec) | 5.9994 | 6.9928 | 12.9922 | 19.4981 |
| Hot trip time (sec) | 1.4738 | 1.7178 | 3.1916 | 4.7899 |

Simulation of IEC thermal memory test may also be accomplished. The new thermal memory test verification in [3] requires:
  Applying a current equal to $I_{pickup} \pm 10\%$ for two hours (equivalent to the thermal equilibrium);
  interrupt the current for a duration of $2 \times T_p \pm 10\%$ ($T_p$ is defined in Table 2 of [3]);
  Apply a current equal to $7.2 \times I_{pickup}$;
  The relay shall trip within 50% of the cold trip time listed in above Table 5.

Figure 3A:
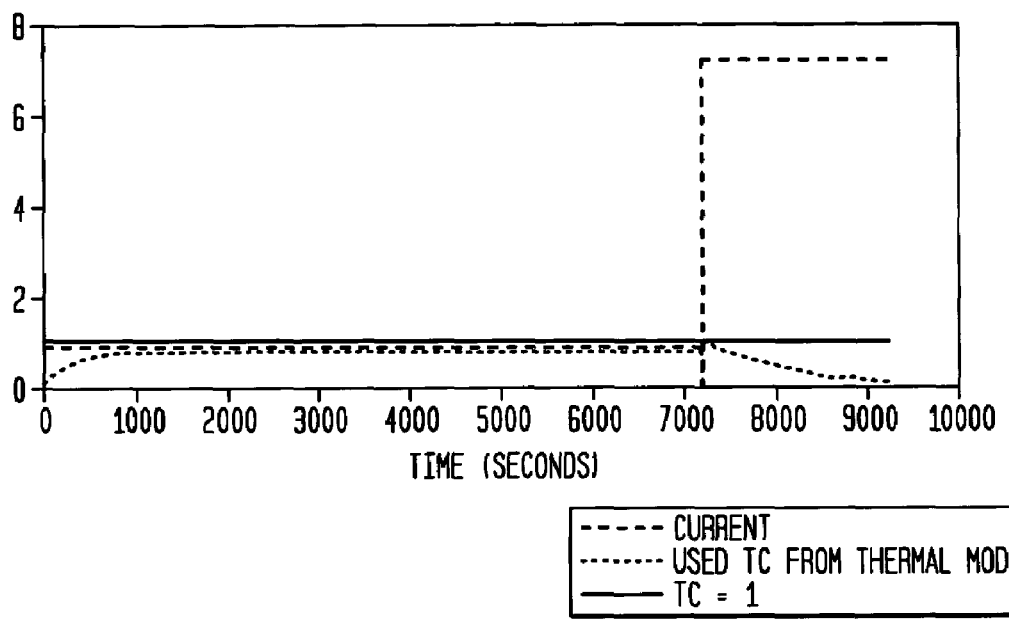
FIG. 3 are the results of a simulation for IEC thermal memory test.
Figure 3B:
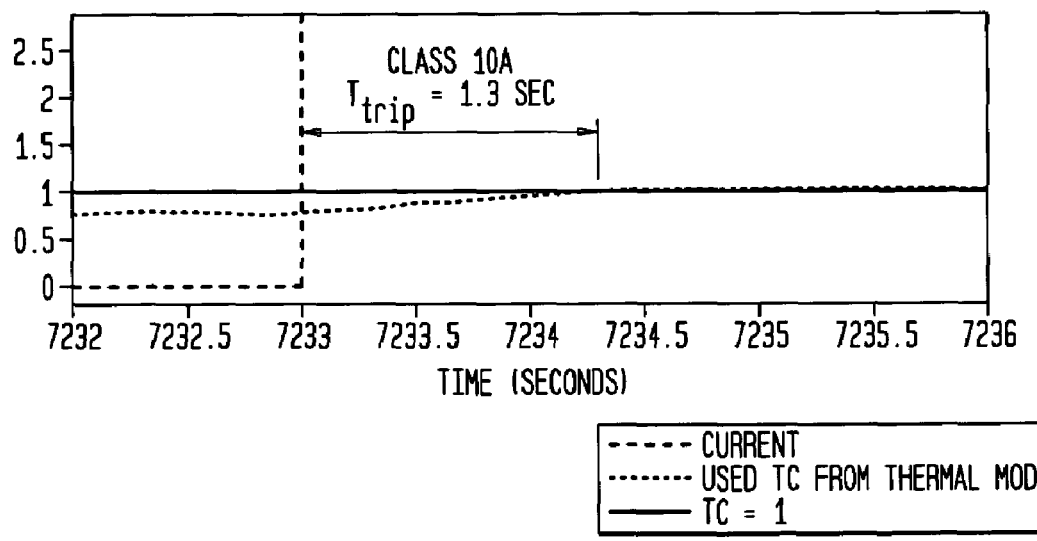

FIGS. 3A and 3B show the simulation results for the IEC thermal memory test verification. FIG. 3B shows an enlarged view around the point of t=7233 sec. Table 6 compares the IEC thermal memory test trip time to the cold trip time. The IEC thermal memory test trip time is less than 50% of the cold trip time.

TABLE 6

Cold trip time and thermal memory test trip time

|  | Class 10A | Class 10 | Class 20 | Class 30 |
|---|---|---|---|---|
| Cold trip time (sec) | 5.9994 | 6.9928 | 12.9922 | 19.4981 |
| Thermal memory test trip time (sec) | 1.3 | 1.5 | 2.6 | 3.9 |

Examining the used thermal capacity for M<1, when motors are running at current below pickup, the temperature rise at thermal equilibrium is proportional to the square of motor line current values. FIG. 4 shows the used thermal capacity for five different M values.

Figure 5:
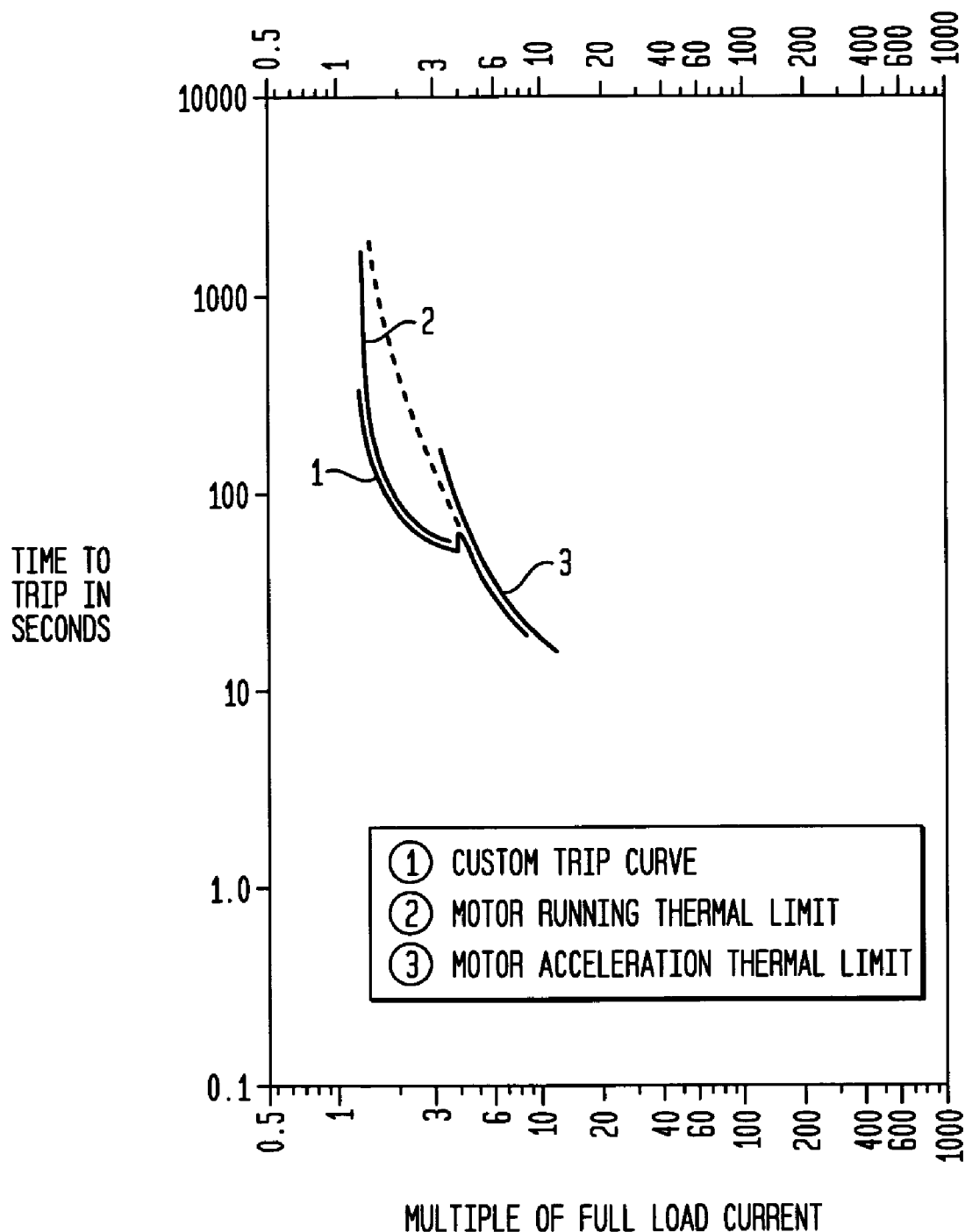
FIG. 5 is typical thermal limit curve provided by motor manufacturers for motors above 250 HP.

For motors above 250 HP, manufacturers may provide thermal limit curves that specify the safe time for running overload and acceleration overload. Curves 2 and 3 in FIG. 5 are the thermal limit curves. One standard trip class curve cannot provide required overload protection for both running overload and acceleration overload. For example, if a standard trip curve is selected based on acceleration safe time curve 3 in FIG. 5, the trip time of the standard trip curve for running overload (the dashed line) is longer than the running safe time specified by manufacturer (curve 2). Therefore a custom trip, for example, curve 1 can be used, which means thermal time constant during acceleration is different from that during running. Running thermal time constant $T_{h-run}$ and acceleration thermal time constant $T_{h-acc}$ can be calculated from the curves 2 and 3 using Eq. (25). Cooling thermal time constant $T_c = 3 \times T_{h-run}$. $M_{acc-run}$ is the multiple of pickup at the changing point of thermal time constants.

Figure 6:
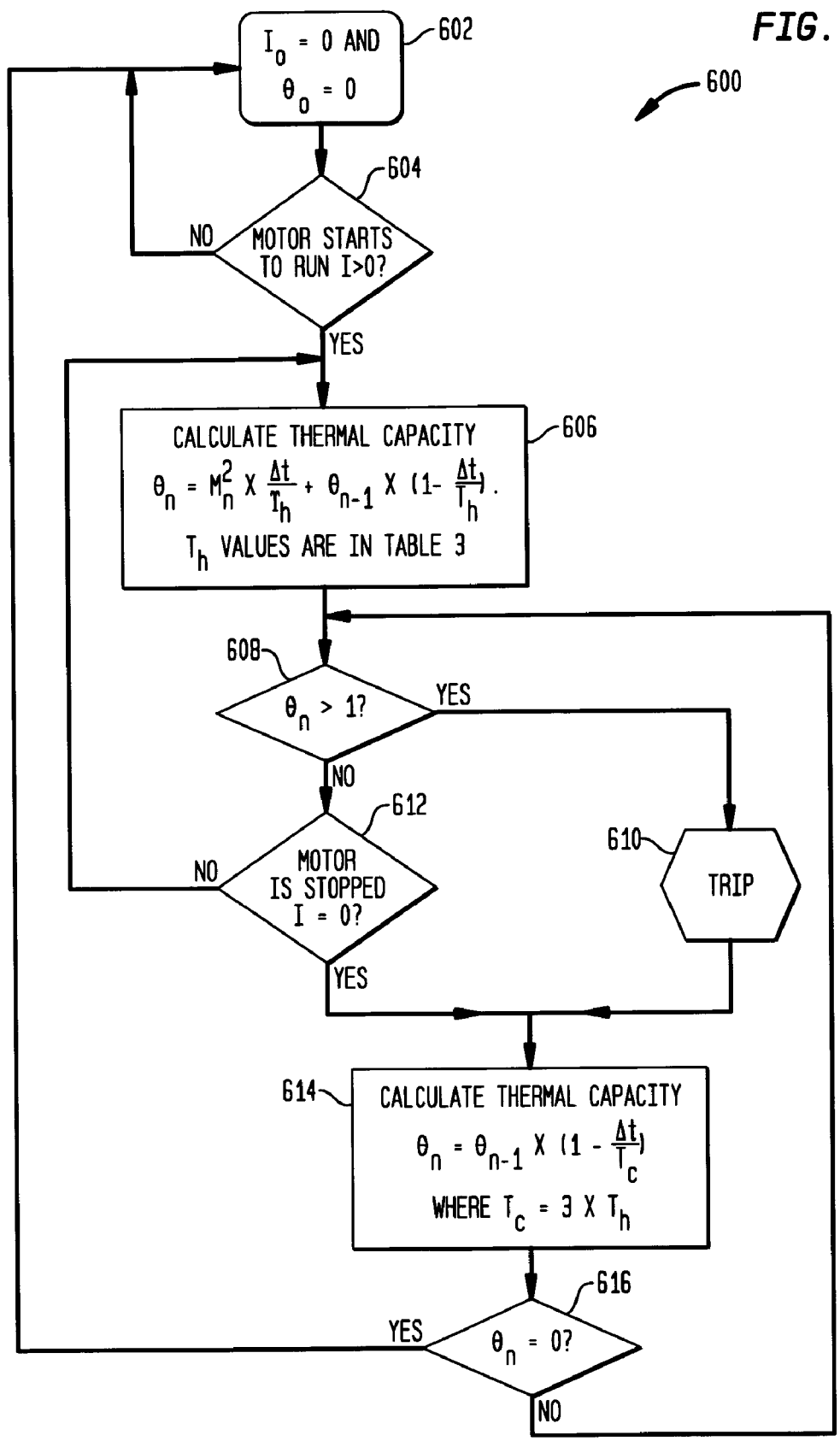
FIG. 6 is a flow chart of a standard trip algorithm 600 according to a first exemplary embodiment of the present invention.
Figure 7:
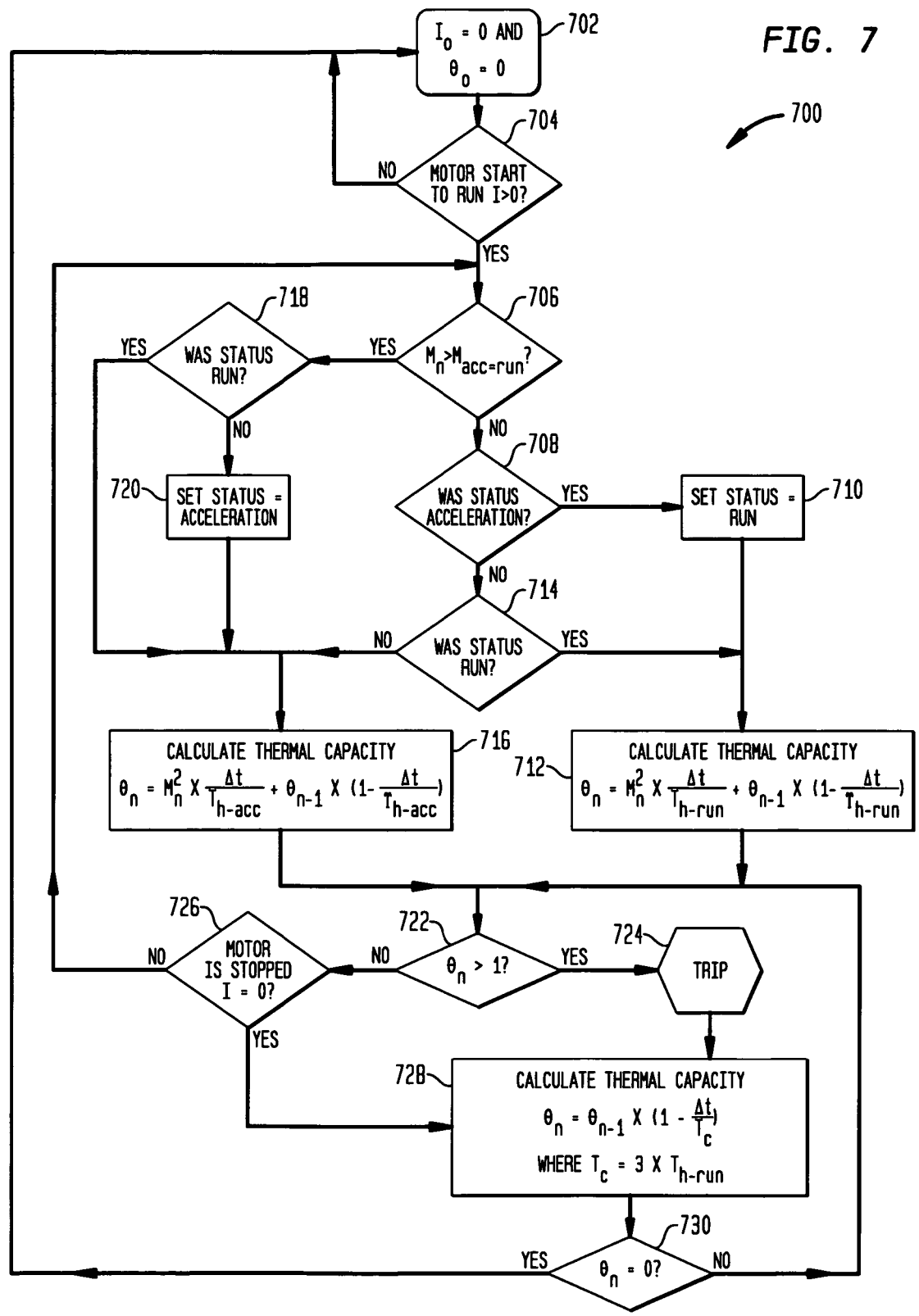
FIG. 7 is a flow chart of a custom trip algorithm 700 according to a second exemplary embodiment of the present invention.

FIGS. 6 and 7 demonstrate exemplary methods for applications using IEC standard or custom trip curves. In FIG. 6 a standard trip algorithm 600 is provided. The algorithm 600 is initiated with the current at zero and the thermal capacity at zero (block 602). The method determines if the current is above zero (block 604). If the current is not above zero, the method proceeds to initiation. If the current is above zero the motor is started, the thermal capacity is calculated using Eq. (22) and $T_h$ values in table 3 (block 606). The method determines if the thermal capacity is above one (block 608). If the thermal capacity is above one, the relay is tripped (block 610). If the thermal capacity remains below or equal to one and the current is not equal to zero (block 612), the motor remains active and the thermal capacity is calculated using Eq. (22). If the relay is tripped or the motor is deactivated, the thermal capacity is calculated using Eq. (23) and $T_c$ equals $3 \times T_h$ (block 614). Once the thermal capacity is back to zero (block 616), the method is reinitiated (block 602).

In FIG. 7 a custom trip algorithm 700 is provided. The algorithm 700 is initiated with the current at zero and the thermal capacity at zero (block 702). The method determines if the current is above zero (block 704). If the current is not above zero, the method proceeds to initiation. If the current is above zero, the motor is started and the method determines if the status of the motor is active or in an acceleration process (block 706). If $M_n \leq M_{acc\text{-}run}$, the method determines if the previous status of the motor was acceleration (block 708). If the motor was accelerating, set status to run (block 710) and calculate the thermal capacity using Eq. (22) with $T_h = T_{h\text{-}run}$ (block 712). If the motor was not accelerating (block 708) and the motor was run or active status (block 714), calculate the thermal capacity using eq. 22 with $T_h = T_{h\text{-}run}$ (block 712). If $M_n > M_{acc\text{-}run}$, the method determines if the previous status of the motor was run (block 718). If the status was run, the method calculates the thermal capacity using Eq. (22) with $T_h = T_{h\text{-}acc}$ (block 716). If the status was not run, the method sets the status to acceleration (block 720) and calculates the thermal capacity using Eq. (22) with $T_h = T_{h\text{-}acc}$ (block 716).

The method determines if the thermal capacity is above one (block 722). If the thermal capacity is above one, the relay is tripped (block 724). If the thermal capacity remains below or equal to one and the current is not equal to zero (block 726), the motor remains active and the thermal capacity is calculated as disclosed earlier in the algorithm 700. If the relay is tripped or the motor is deactivated, the thermal capacity is calculated using Eq. (23) and $T_c$ equals $3 \times T_{h\text{-}run}$ (block 728). Once the thermal capacity is back to zero (block 730), the method is reinitiated (block 702).

The systems and methods may be implemented using analog components and/or digital components. The systems and methods may be implemented within software that utilizes various components to implement the embodiments described herein. Aspects disclosed in the exemplary embodiment may be utilized independently or in combination with other exemplary embodiments. Moreover, it will be understood that the foregoing is only illustrative of the principles of the invention, and that various modifications can be made by those skilled in the art without departing from the scope and spirit of the invention. Persons skilled in the art will appreciate that the present invention can be practiced by other than the described embodiments, which are presented for purposes of illustration rather than of limitation, and the present invention is limited only by the claims that follow.

REFERENCES CITED

[1] IEEE Std C37.112-1996, *IEEE Standard Inverse-Time Characteristic Equations for Overcurrent Relays*.
[2] Benmouyal, G.; Meisinger, M.; Burnworth, J.; Elmore, W. A.; Freirich, K.; Kotos, P. A.; Leblanc, P. R.; Lerley, P. J.; McConnell, J. E.; Mizener, J.; Pinto de Sa, J.; Ramaswami, R.; Sachdev, M. S.; Strang, W. M.; Waldron, J. E.; Watansiriroch, S.; Zocholl, S. E.; "IEEE standard inverse-time characteristic equations for over-current relays," IEEE Transactions on Power Delivery, Volume 14, Issue 3, July 1999 Page(s): 868-872.
[3] Amendment 2 to IEC 60947-4-2, Ed. 2, Document No. 17B/1406/CC.
[4] IEC 60947-4-2 Edition 2.1 2002-03, *Low-Voltage Switchgear and Controlgear—Part 4-2: Contactors and Motor-Starters—AC Semiconductor Motor Controllers and Starters*.
[5] IEEE Std 620-1996, *IEEE Guide for the Presentation of Thermal Limit Curves for Squirrel Cage Induction Machines*.
[6] Abou-El-Ela, M. S.; Megahed, A. I.; Malik, O. P.; "Thermal model based digital relaying algorithm for induction motor protection," Electrical and Computer Engineering, 1996. Canadian Conference on, Volume 2, 26-29 May 1996 Page(s): 1016-1019 vol. 2.
[7] Samir F. Farag; T. Cronvich; "Motor Controller," US patent number US005206572A, Apr. 27, 1993.

What is claimed is:

1. An over-current relay protecting an induction motor comprising:
    a module for determining the current drawn by the motor;
    a module for determining the state of the motor;
    a module for calculating a used thermal capacity based on a first formula when the motor is in an active state, wherein the first formula for used thermal capacity is selected from the group consisting of $$\theta_n = M_n^2 \times \frac{\Delta t}{T_h} + \theta_{n-1} \times \left(1 - \frac{\Delta t}{T_h}\right) \text{ and}$$

$$\theta_n = M_n^2 \left(1 - e^{-\frac{\Delta t}{T_h}}\right) + \theta_{n-1} e^{-\frac{\Delta t}{T_h}}$$

wherein n is a sample number, $\Delta t$ is a sampling period, $T_h$ is a thermal time constant, $\theta_n$ is the used thermal capacity at an $n^{th}$ sample, and $M_n$ is multiple of a pickup current of the relay at the $n^{th}$ sample;
    a module for calculating the used thermal capacity based on a second formula when the motor is in an inactive state; and
    a module for tripping the relay when the used thermal capacity attains a threshold.

2. An over-current relay protecting an induction motor comprising:
    a module for determining the current drawn by the motor;
    a module for determining the state of the motor;
    a module for calculating a used thermal capacity based on a first formula when the motor is in an active state;
    a module for calculating the used thermal capacity based on a second formula when the motor is in an inactive state, wherein the second formula for used thermal capacity is selected from the group consisting of $$\theta_n = \theta_{n-1} \times \left(1 - \frac{\Delta t}{T_c}\right) \text{ and } \theta_n = \theta_{n-1} e^{-\frac{\Delta t}{T_c}}$$

wherein n is a sample number, $\Delta t$ is a sampling period, $T_c$ is a thermal time constant, and $\theta_n$ is the used thermal capacity at an $n^{th}$ sample; and
    a module for tripping the relay when the used thermal capacity attains a threshold.

3. The relay of claim 1, further comprising:
    a module for calculating the used thermal capacity based on a third formula when the motor is in an acceleration state.

4. The relay of claim 3, wherein the third formula for used thermal capacity is selected from the group consisting of $$\theta_n = M_n^2 \times \frac{\Delta t}{T_{h-acc}} + \theta_{n-1} \times \left(1 - \frac{\Delta t}{T_{h-acc}}\right)$$

and $$\theta_n = M_n^2\left(1 - e^{-\frac{\Delta t}{T_{h-acc}}}\right) + \theta_{n-1} e^{-\frac{\Delta t}{T_{h-acc}}}$$

wherein n is a sample number, $\Delta t$ is a sampling period, $T_{h-acc}$ is an acceleration thermal time constant, $\theta_n$ is the used thermal capacity at an $n^{th}$ sample, and $M_n$ is multiple of a pickup current of the relay at the $n^{th}$ sample.

5. The relay of claim 1, further comprising:
a module for calculating the used thermal capacity based on a fourth formula when the motor is in a deceleration state.

6. The relay of claim 5, wherein the fourth formula for used thermal capacity is selected from the group consisting of $$\theta_n = M_n^2 \times \frac{\Delta t}{T_{h-decel}} + \theta_{n-1} \times \left(1 - \frac{\Delta t}{T_{h-decel}}\right) \text{ and}$$

$$\theta_n = M_n^2\left(1 - e^{-\frac{\Delta t}{T_{h-decel}}}\right) + \theta_{n-1} e^{-\frac{\Delta t}{T_{h-decel}}}$$

wherein n is a sample number, $\Delta t$ is a sampling period, $T_{h-decel}$ is a deceleration thermal time constant, $\theta_n$ is the used thermal capacity at an $n^{th}$ sample, and $M_n$ is multiple of a pickup current of the relay at the $n^{th}$ sample.

7. The relay of claim 1, wherein the relay complies with International Electrotechnical Commission standard 60947-4-2 and amendment 2 of International Electrotechnical Commission standard 60947-4-2.

8. A method for an over-current relay protecting an induction motor comprising the following actions:
determining the current drawn by the motor;
determining the state of the motor;
calculating a used thermal capacity based on a first formula when the motor is in an active state, wherein the first formula for used thermal capacity is selected from the group consisting of $$\theta_n = M_n^2 \times \frac{\Delta t}{T_h} + \theta_{n-1} \times \left(1 - \frac{\Delta t}{T_h}\right)$$

and $$\theta_n = M_n^2\left(1 - e^{-\frac{\Delta t}{T_h}}\right) + \theta_{n-1} e^{-\frac{\Delta t}{T_h}}$$

wherein n is a sample number, $\Delta t$ is a sampling period, $T_h$ is a thermal time constant, $\theta_n$ is the used thermal capacity at an $n^{th}$ sample, and $M_n$ is multiple of a pickup current of the relay at the $n^{th}$ sample;
calculating the used thermal capacity based on a second formula when the motor is in an inactive state; and
tripping the relay when the used thermal capacity attains a threshold.

9. A method for an over-current relay protecting an induction motor comprising the following actions:
determining the current drawn by the motor;
determining the state of the motor;
calculating a used thermal capacity based on a first formula when the motor is in an active state;
calculating the used thermal capacity based on a second formula when the motor is in an inactive state, wherein the second formula for used thermal capacity is selected from the group consisting of $$\theta_n = \theta_{n-1} \times \left(1 - \frac{\Delta t}{T_c}\right) \text{ and } \theta_n = \theta_{n-1} e^{-\frac{\Delta t}{T_c}}$$

wherein n is a sample number, $\Delta t$ is a sampling period, $T_c$ is a thermal time constant, and $\theta_n$ is the used thermal capacity at an $n^{th}$ sample; and
tripping the relay when the used thermal capacity attains a threshold.

10. The method of claim 8, further comprising the following actions:
calculating the used thermal capacity based on a third formula when the motor is in an acceleration state.

11. The method of claim 10, wherein the third formula for used thermal capacity is selected from the group consisting of $$\theta_n = M_n^2 \times \frac{\Delta t}{T_{h-acc}} + \theta_{n-1} \times \left(1 - \frac{\Delta t}{T_{h-acc}}\right)$$

and $$\theta_n = M_n^2\left(1 - e^{-\frac{\Delta t}{T_{h-acc}}}\right) + \theta_{n-1} e^{-\frac{\Delta t}{T_{h-acc}}}$$

wherein n is a sample number, $\Delta t$ is a sampling period, $T_{h-acc}$ is an acceleration thermal time constant, $\theta_n$ is the used thermal capacity at an $n^{th}$ sample, and $M_n$ is multiple of a pickup current of the relay at the $n^{th}$ sample.

12. The method of claim 10, further comprising the following actions:
calculating the used thermal capacity based on a fourth formula when the motor is in a deceleration state.

13. The method of claim 12, wherein the fourth formula for used thermal capacity is selected from the group consisting of $$\theta_n = M_n^2 \times \frac{\Delta t}{T_{h-decel}} + \theta_{n-1} \times \left(1 - \frac{\Delta t}{T_{h-decel}}\right)$$

and $$\theta_n = M_n^2\left(1 - e^{-\frac{\Delta t}{T_{h-decel}}}\right) + \theta_{n-1} e^{-\frac{\Delta t}{T_{h-decel}}}$$

wherein n is a sample number, $\Delta t$ is a sampling period, $T_{h-decel}$ is a deceleration thermal time constant, $\theta_n$ is the used thermal capacity at an $n^{th}$ sample, and $M_n$ is multiple of a pickup current of the relay at the $n^{th}$ sample.

14. The method of claim 12, wherein a standard IEC trip class curves is based on induction motor thermal model IEC standard 60947-4-2 and amendment 2 of IEC standard 60947-4-2.

15. The system of claim 1, wherein the used thermal capacity tracks the thermal capacity throughout various motor states.

* * * * *